United States Patent
Schuler

(10) Patent No.: US 9,260,975 B2
(45) Date of Patent: Feb. 16, 2016

(54) APPARATUS AND METHODS FOR ELECTRICITY GENERATION FROM EXHAUST OF CONDENSER OF HVAC SYSTEM

(71) Applicant: Berhnard L. Schuler, Austin, TX (US)

(72) Inventor: Berhnard L. Schuler, Austin, TX (US)

(73) Assignee: FANERGIES INC, Austin, TX (US)

( * ) Notice: Subject to any disclaimer, the term of this patent is extended or adjusted under 35 U.S.C. 154(b) by 0 days.

(21) Appl. No.: 13/905,693

(22) Filed: May 30, 2013

(65) Prior Publication Data

US 2014/0356167 A1    Dec. 4, 2014

(51) Int. Cl.
F03D 9/00 (2006.01)
F01D 15/10 (2006.01)
F03D 1/04 (2006.01)
F03D 1/06 (2006.01)

(52) U.S. Cl.
CPC ........ *F01D 15/10* (2013.01); *F03D 1/04* (2013.01); *F03D 1/0608* (2013.01); *F03D 1/0625* (2013.01); *F03D 9/00* (2013.01); *Y02B 10/30* (2013.01)

(58) Field of Classification Search
CPC .......................................................... F03D 9/00
USPC ............................................................ 290/55
See application file for complete search history.

(56) References Cited

U.S. PATENT DOCUMENTS

| | | | | |
|---|---|---|---|---|
| 2,004,853 A | * | 6/1935 | Crary | 415/4.5 |
| 3,720,840 A | * | 3/1973 | Gregg | 290/55 |
| 4,016,725 A | * | 4/1977 | Fiss | 60/690 |
| 4,021,135 A | * | 5/1977 | Pedersen et al. | 415/208.2 |
| 4,159,426 A | * | 6/1979 | Staton | 290/44 |
| 4,368,007 A | * | 1/1983 | Ely | 416/238 |
| 5,512,788 A | * | 4/1996 | Berenda et al. | 290/55 |
| 6,043,565 A | * | 3/2000 | Les Strange | 290/55 |
| 6,365,985 B1 | | 4/2002 | Cohen | |
| 6,893,223 B2 | * | 5/2005 | Roberts | 416/210 R |
| 7,112,893 B1 | * | 9/2006 | Villanueva | 290/55 |
| 7,208,846 B2 | | 4/2007 | Liang | |
| 7,538,447 B1 | * | 5/2009 | Berenda et al. | 290/55 |
| 7,722,313 B1 | * | 5/2010 | Dilorio | 415/80 |
| 7,834,477 B2 | * | 11/2010 | Sheikhrezai | 290/55 |
| 7,939,958 B2 | * | 5/2011 | Todorof | 290/55 |
| 7,999,407 B2 | | 8/2011 | Saluccio | |
| 8,013,465 B2 | | 9/2011 | Gilbert | |
| 8,183,709 B1 | * | 5/2012 | Manning | 290/55 |
| 8,384,234 B2 | * | 2/2013 | Gilbert | 290/55 |
| 8,564,148 B1 | * | 10/2013 | Novak | 290/52 |
| 8,786,151 B1 | * | 7/2014 | Cole et al. | 310/90 |
| 2003/0057708 A1 | | 3/2003 | Wu | |
| 2005/0150225 A1 | * | 7/2005 | Gwiazda et al. | 60/641.1 |
| 2006/0188364 A1 | * | 8/2006 | Fritz | 415/4.2 |
| 2007/0189899 A1 | * | 8/2007 | Serpa | 416/132 B |
| 2007/0248466 A1 | * | 10/2007 | Lotrionte | 416/223 R |
| 2009/0072541 A1 | | 3/2009 | Van Harselaar | |
| 2009/0146425 A1 | * | 6/2009 | Widisky | 290/44 |
| 2010/0244455 A1 | * | 9/2010 | Berginc | 290/55 |

(Continued)

FOREIGN PATENT DOCUMENTS

JP          2002054553 A    *    2/2002
WO    WO 2012149347 A2    *    11/2012

*Primary Examiner* — Joseph Waks
(74) *Attorney, Agent, or Firm* — Abel Law Group, LLP

(57) ABSTRACT

A low RPM permanent magnet generator mounted over the exhaust port of a HVAC condenser provides a direct drive generator that allows low cogging and low startup resistance to effectively produce electricity at low wind speeds.

7 Claims, 5 Drawing Sheets

(56) References Cited

U.S. PATENT DOCUMENTS

| | | |
|---|---|---|
| 2011/0121576 A1 | 5/2011 | Bayko |
| 2011/0204634 A1* | 8/2011 | Skala .............................. 290/44 |
| 2011/0204646 A1 | 8/2011 | Farrell |
| 2011/0285135 A1 | 11/2011 | Ortiz et al. |
| 2012/0038162 A1* | 2/2012 | Smith et al. .................... 290/52 |
| 2012/0038170 A1 | 2/2012 | Stuart et al. |
| 2012/0112465 A1 | 5/2012 | Morrison |
| 2012/0286515 A1* | 11/2012 | Barzilai et al. ................. 290/52 |
| 2013/0341930 A1* | 12/2013 | Campagna ...................... 290/54 |
| 2014/0072428 A1* | 3/2014 | Chambers ......................... 416/1 |

* cited by examiner

APPARATUS AND METHODS FOR ELECTRICITY GENERATION FROM EXHAUST OF CONDENSER OF HVAC SYSTEM

CROSS-REFERENCE TO RELATED APPLICATIONS

The present disclosure is related to, claims priority from and the benefit of United States provisional application entitled "Apparatus and Methods for Power Generation from Exhaust of Condenser of Central Air System" by the same inventor, Ser. No. 61/654,621, filed Jun. 1, 2012, the disclosure of which is incorporated herein by reference. The present disclosure is also related to U.S. provisional application Ser. No. 61/804,525, filed Mar. 22, 2013, having the same title and inventor, the disclosure of which is incorporated herein by reference.

TECHNICAL FIELD

This disclosure relates generally to turbine generators and more particularly to a turbine connected to a Heating, Ventilation, and Air Conditioning ("HVAC") condenser exhaust outlet.

BACKGROUND

The present generator design improves the electricity output, given the constant volume of moving fluid, gas, air or wind produced by the exhaust of a HVAC condenser. HVAC systems use condensers to move hot or cold air out of a building. During this process, the condenser produces an exhaust gas with a typical wind speed of 15-25 mph.

SUMMARY

The present methods and apparatus harness wind energy by mounting the wind turbine horizontally over the exhaust of the condenser without impacting the operation of the HVAC condenser. A generator of the present disclosure produces electricity at a rate that is proportional to the diameter of the condenser exhaust, usually between 100-500 watts/hour. The wattage output is proportional to the force of the exhaust that activates the generator.

More generally, the present disclosure describes an energy recovery system. A conduit, such as the frame of the present disclosure, with a width, a first end and a second end, is configured so that the first end of the conduit receives a gas flow transmitted by a gas flow channel of a gas flow source, such as a HVAC exhaust, and the conduit is configured to transmit the received gas flow from the first end toward the second end of the conduit. The gas flow channel has a diameter.

A blade assembly having a diameter is coupled to the conduit and the blade assembly is configured to be moved with relatively low torque of less than or equal to 0.5 Newton-meters starting torque when the received gas flow is transmitted from the first end of the conduit. The conduit width is greater than the blade assembly diameter so that a portion of the gas flow transmitted by the gas flow channel can bypass the blade assembly to limit back pressure on the gas flow source. The blade assembly diameter is greater than the gas flow channel diameter.

An electrical generator is coupled to the blade assembly. The electrical generator is configured to generate electricity when the blade assembly moves.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

Before describing the drawings, it may be helpful to define some selected components and features of the present apparatus.

Generator:

a low RPM, alternating current (AC) permanent magnet generator. The generator, preferably, is a direct drive generator that provides low cogging and low startup resistance to effectively start producing electricity at low, less powerful exhaust speeds. Although alternative embodiments having a non-direct drive generator, that is, a generator with gears or brushes would be functional, a gearless, brushless direct drive generator is preferred. A preferred exemplary embodiment of the generator provides:

100-500 watts/hour rated continuous power; contingent on size of the condenser exhaust;

24 v or 48 v rated voltage;

Less than or equal to 1000 rated RPMs;

Less than or equal to 0.5 Newton-meters (Nm) rated starting torque; and

−30 C-180 C working temperature

Electromagnetic Braking System

Blade Design (with Hub 640):

The blade length is relatively short compared to other wind turbines with the same output, the blades are designed with a higher arc angle than is found with similar generators to maximize torque and get as many RPMs to the generator. A preferred exemplary embodiment provides blades having the following specifications:

Six blade high torque design

Blade thickness is 0.0625 of an inch made from a light weight material

Blade shape is that of a 90 degree arc angle from a cylinder with a two inch radius 3.14 inch width at the widest section of the blade 0.5 inch width at top and bottom of blade Blade length is contingent on the diameter GFCW (FIGS. 3 and 6) of the condenser exhaust. Blade diameter BD (FIG. 6) is one inch larger that the diameter GFCW of the condenser exhaust. Blade length is important to achieving the power generation performance because the wind speed at the outer edge of the exhaust is more powerful than on the inner edge.

Six blades are connected to a hub 640 with a diameter of 3.25 inches (preferably). The relatively small diameter of the hub 640 allows for more blade coverage over the source area.

Frame—

The frame acts as a funnel and collects wind that would otherwise disperse away from the condenser. This exhaust gas is directed over the generator blades. In preferred embodiments, the diameter of the frame is approximately 1.0 inch larger than the diameter of the condenser exhaust. The frame inner width IW is 0.5 inches larger than the blade diameter BD.

Wire Guard—

The present generator design is covered by a wire guard which does not impede the flow of exhaust and does not impact the flow of air through the condenser unit. The wire guard also serves as a means to protect anyone from injury by the spinning turbine blades.

Tests of a generator of the present disclosure yield the following results:

Test Results—Turbine generator assembly with rated potential of 300 watts/hour

Test #1

24 volts

550 RPMs 305 watts/hour

Test #2

48 volts

550 RPMs 305 watts/hour

Figures 1, 2:
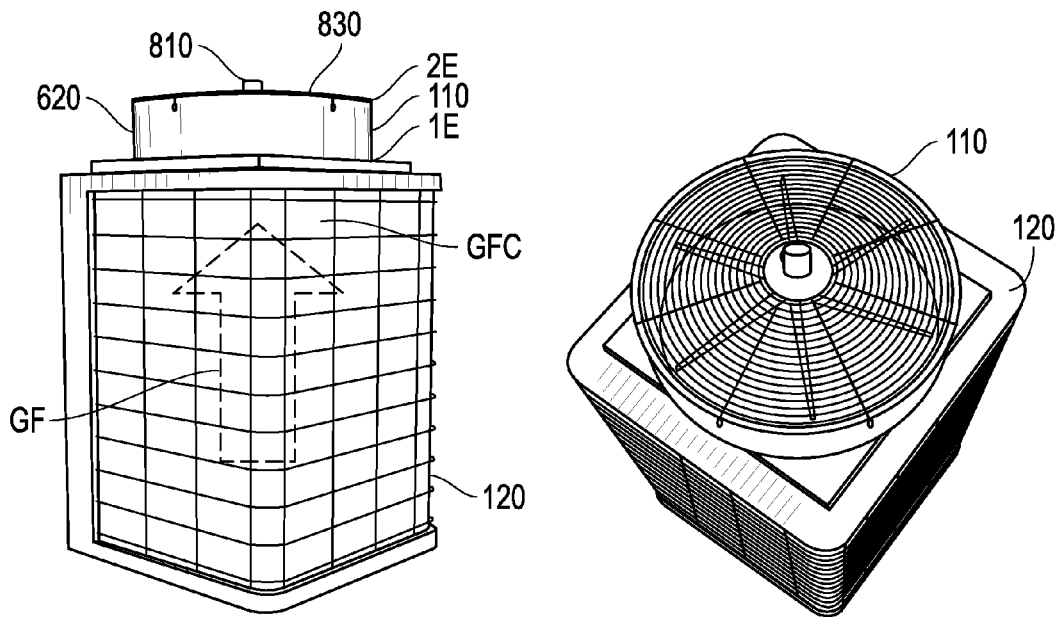
FIG. 1 is an isometric side view illustration of a condenser unit having a turbine generator of the present disclosure attached the exhaust thereof.
FIG. 2 is an isometric top view illustration of the condenser unit of FIG. 1 having a turbine generator of the present disclosure attached the exhaust thereof.

Turning now to the drawings, FIG. 1 is an isometric side view illustration of a condenser unit having an exemplary embodiment of a turbine generator of the present disclosure attached the exhaust thereof. Generator assembly 110 is mounted over the exhaust of condenser unit 120. Wire guard 830 is mounted on top of frame 620 and generator 810 is mounted to rotatable blades 410 (see FIG. 4) which are suspended under wire guard 830 and housed in frame 620.

FIG. 2 is an isometric top view illustration of the air conditioning unit of FIG. 1 having a turbine generator of the present disclosure attached the exhaust thereof. Blades housed in assembly 110 rotate from exhaust escaping condenser 120 and produce energy with generator 810.

Figure 3:
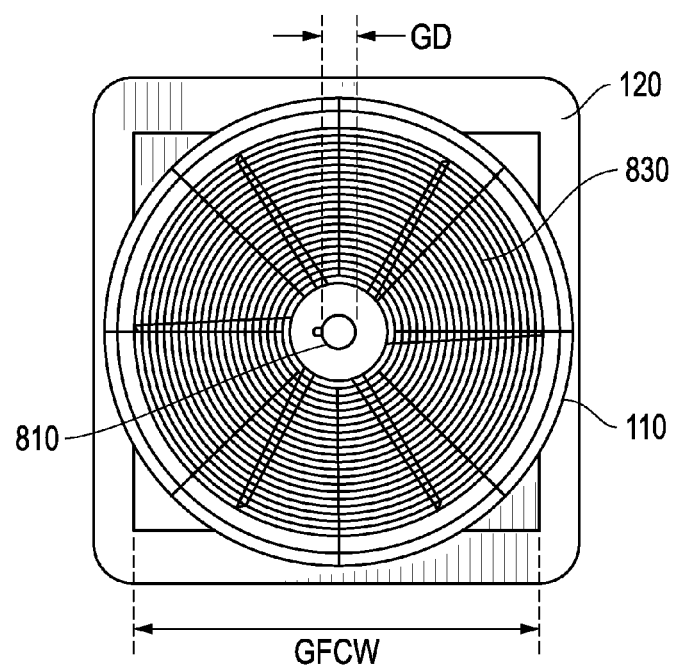
FIG. 3 is a top view illustration of the condenser unit of FIG. 1 having a turbine generator of the present disclosure attached the exhaust thereof.

FIG. 3 is a top view illustration of the condenser unit of FIG. 1 having an exemplary embodiment of turbine generator 810 of the present disclosure attached the exhaust thereof. Generator 810 has a generator diameter GD that is less than the blade diameter BD. Since all electrical generators inherently have, by definition, a stator and a rotor. The stator and the rotor each have a diameter (also generally indicated by reference GD) that is less than the blade diameter BD. Exhaust air from condenser 120 is channeled by frame 620 to impel the rotation of blades housed in frame 620.

Figures 4, 5:
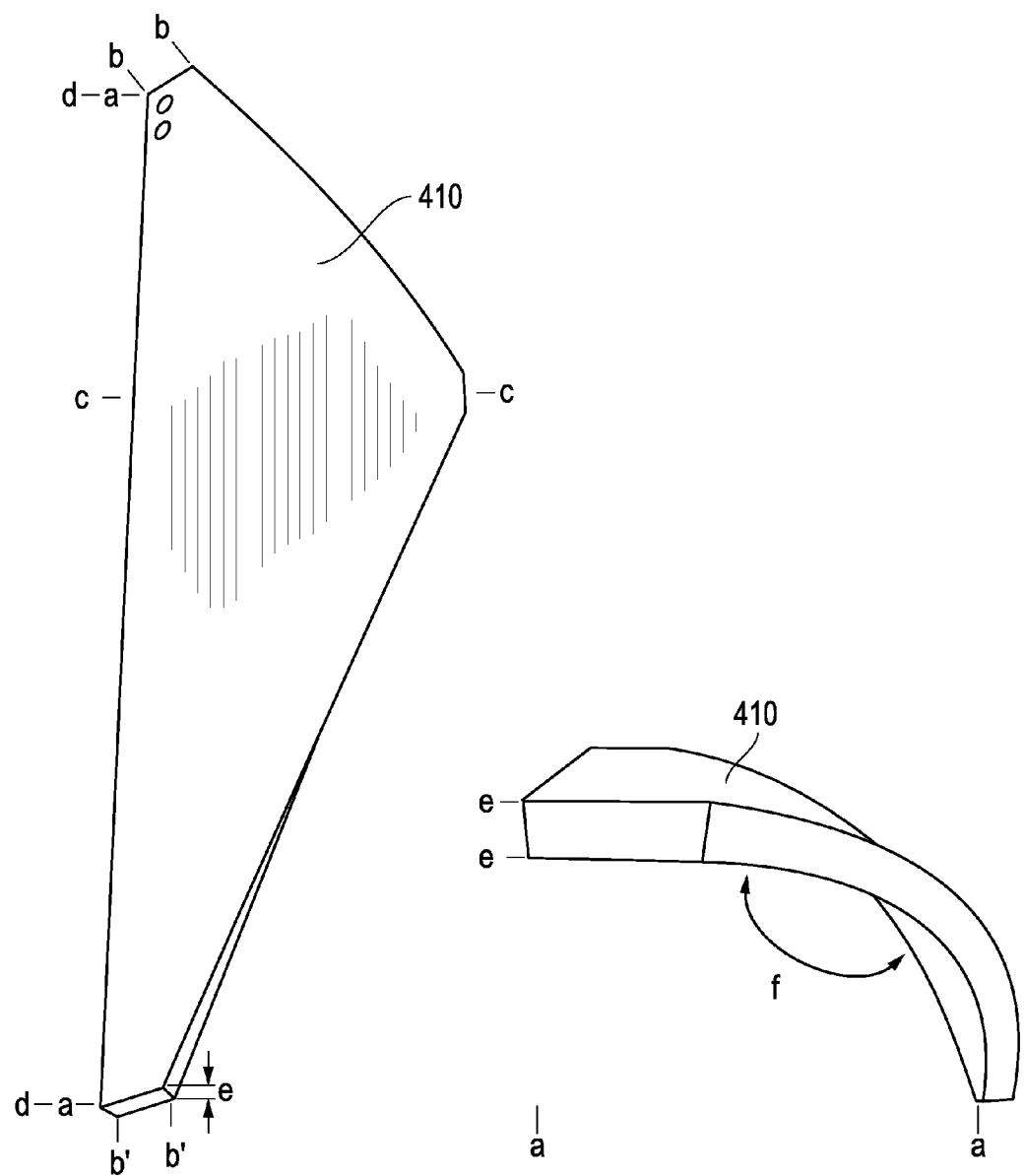
FIG. 4 is top view isometric illustration of a turbine blade of a generator of the present disclosure.
FIG. 5 is side view isometric illustration of a turbine blade of a generator of the present disclosure.

FIG. 4 is top view isometric illustration of an exemplary embodiment of a turbine blade of a generator of the present disclosure. The length of the blade 410, line d-d, is selected based on the diameter of the condenser exhaust. The blade length is longer than the radius of the condenser exhaust, preferably in the range of by 0.5 to 1.0 inch. The perimeter of blade 410 roughly describes a scalene triangle of edges d-d, b-e, c-a, having the widest section bisected by line c-c. The triangle shape is cropped by edge b-b at the tip closest to line c-c and edge b'-b' at the opposite tip. The portion from line c-c to tip b-b is one third the length of line d-d. The portion from line c-c to tip b'-b' is two thirds the length of blade 410. In a preferred embodiment, the length of line c-c is 3.14 inches, the length of edge b-b is 0.5 inches and the width e of blade 410 is 0.0625 inches. Blade 410 length d-d is contingent on the diameter GFCW (FIG. 6) of the condenser exhaust port. The blade 410 length d-d is in the range of 0.5 to 1.0 inch larger than the condenser exhaust port diameter GFCW, preferably.

FIG. 5 is side view isometric illustration of an exemplary embodiment of a turbine blade of a generator of the present disclosure. The thickness e-e of blade 410 is 0.0625 inches. Blade 410 is formed to curve 90 degree from the x-axis with a curvature radius f of 2 inches.

Figure 6:
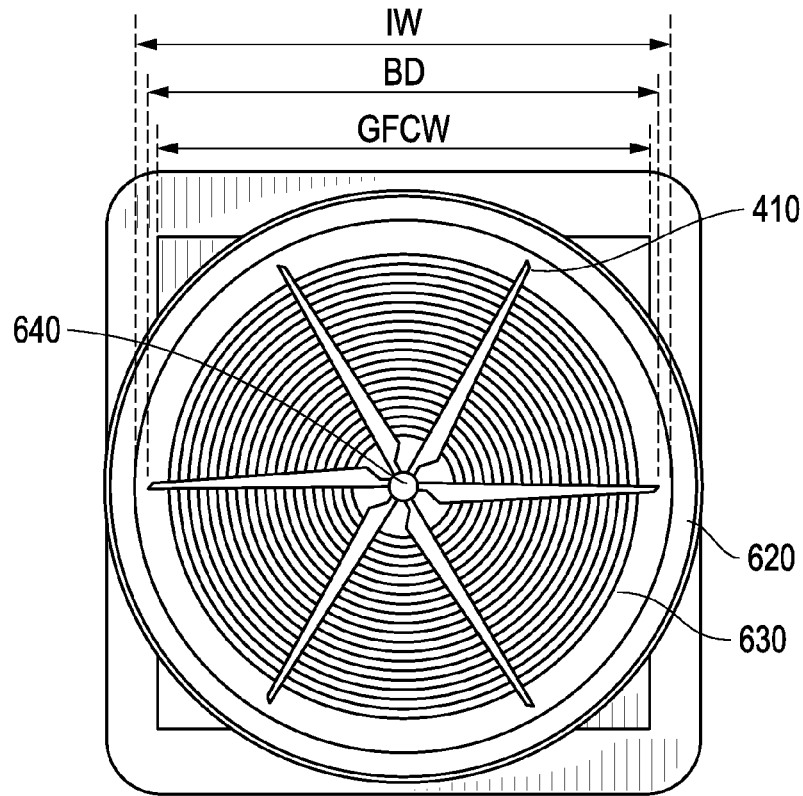
FIG. 6 is a top view illustration of a frame and blade assembly of the present disclosure placed on the exhaust of a condenser unit.

FIG. 6 is a top view illustration of an exemplary embodiment of a frame and blade assembly of the present disclosure placed on the exhaust of a condenser unit. In a preferred embodiment, 3.25 inch diameter hub 640 is mounted over the exhaust of an HVAC condenser unit. Blades 610 are mounted to hub 640 with blade diameter BD extended some distance, such as 0.5 inch, for example, longer than the diameter GFCW of condenser exhaust 630. Frame 620 is disposed around blades 410 and directs blowing exhaust gas over blades 410. Preferably, the diameter IW of frame 620 is one inch larger than the diameter GFCW of the gas flow channel of condenser exhaust 630.

Figure 7:
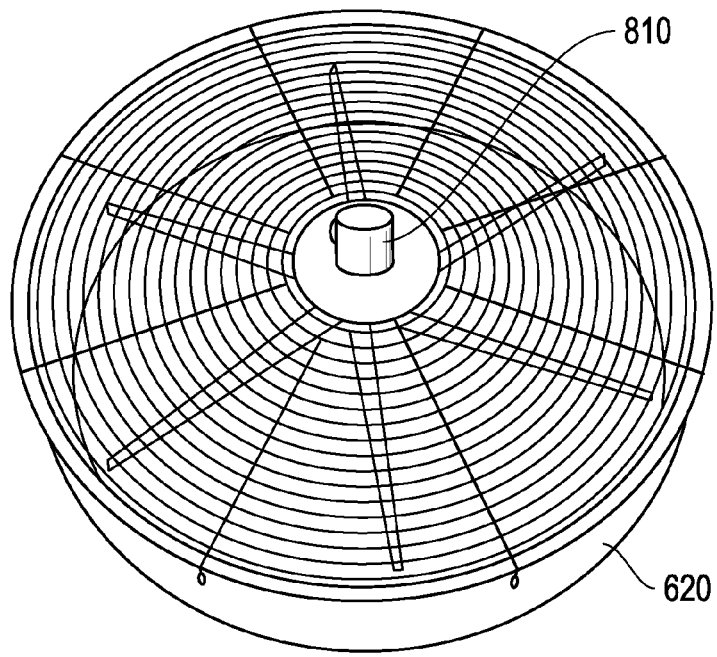
FIG. 7 is a side view isometric illustration of a turbine generator assembly of the present disclosure.

FIG. 7 is a top and side view isometric illustration of an exemplary embodiment of a turbine generator assembly of the present disclosure.

Figure 8:
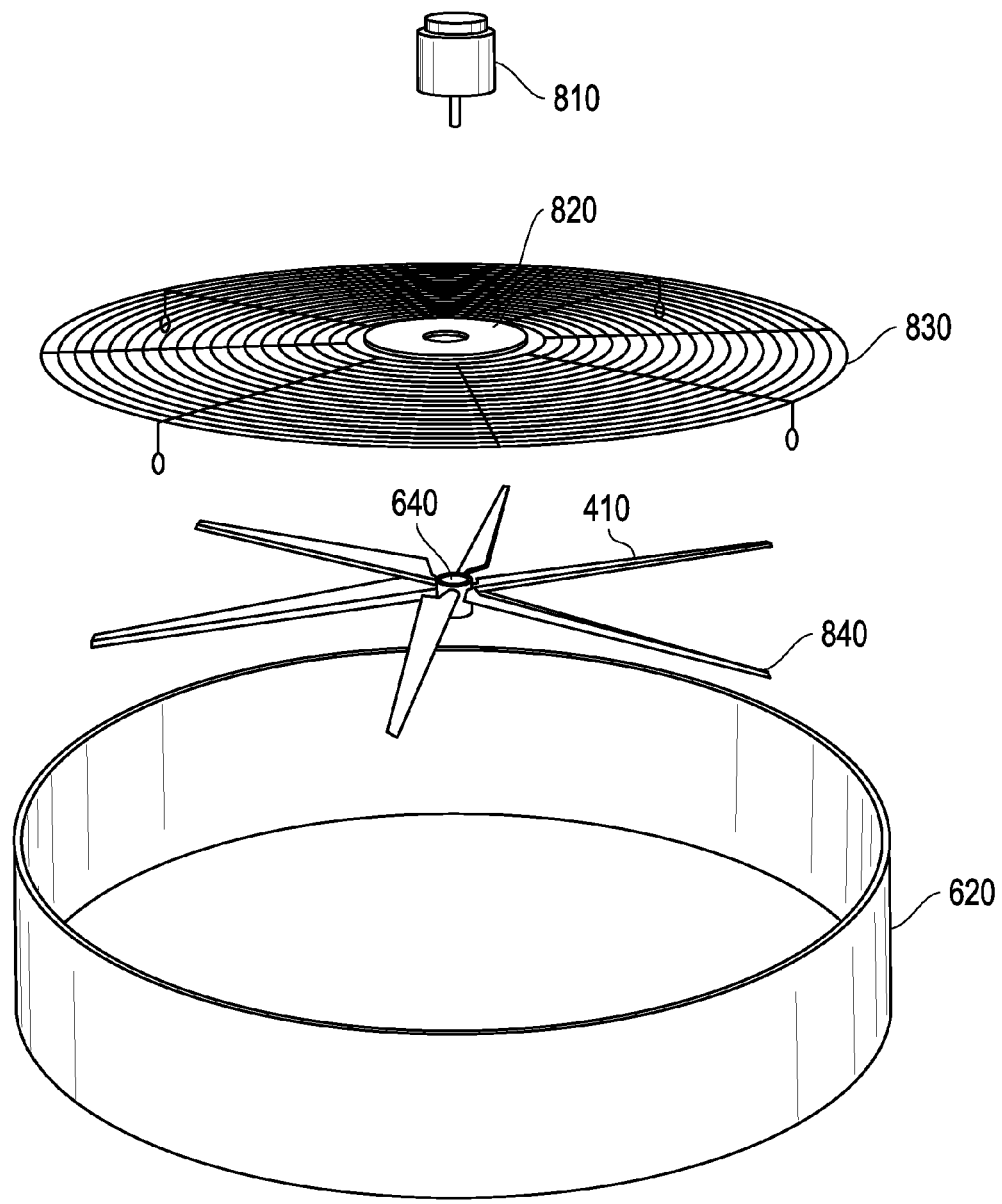
FIG. 8 is an exploded side view illustration of a turbine generator assembly of the present disclosure.

FIG. 8 is an exploded side view illustration of an exemplary embodiment of a turbine generator assembly of the present disclosure. Low revolutions per minute (RPM) permanent magnet generator 810 is mounted to generator mounting block 820, supported by wire guard 830. Blade and hub assembly 840, comprised of blades 410 and hub 640, is connected to generator 810 and disposed within frame 620. Wire guard 830 is mounted on the top of frame 620.

Figure 9A:
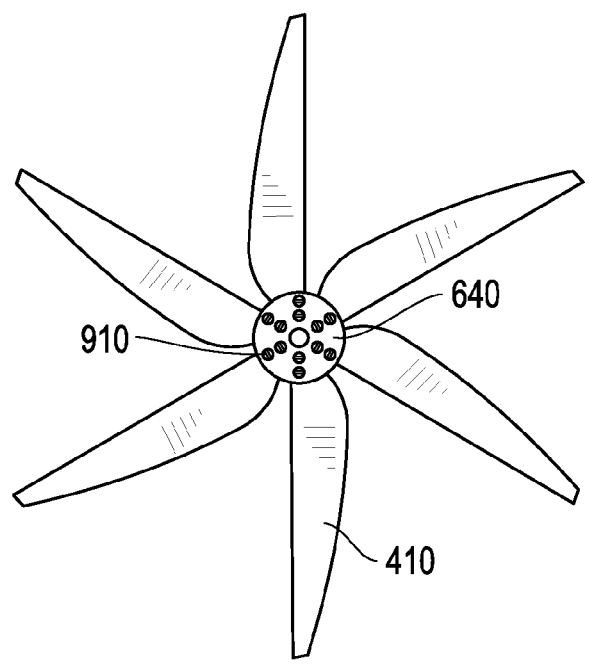
FIG. 9A is a top view illustration of an exemplary embodiment of a blade assembly of the present disclosure.

FIG. 9A is a top view of an exemplary embodiment of a blade assembly of the present disclosure. Blades 410 are attached to hub 640 with fasteners at fastener locations 910.

Figure 9B:
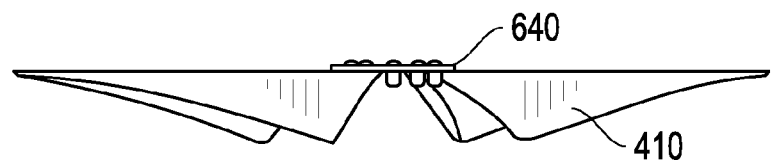
FIG. 9B is an isometric side view illustration of an exemplary embodiment of a blade assembly of FIG. 9A.

FIG. 9B is a side view of an exemplary embodiment of a blade assembly of FIG. 9A. The curved topography of blades 410 is apparent.

Figure 10:
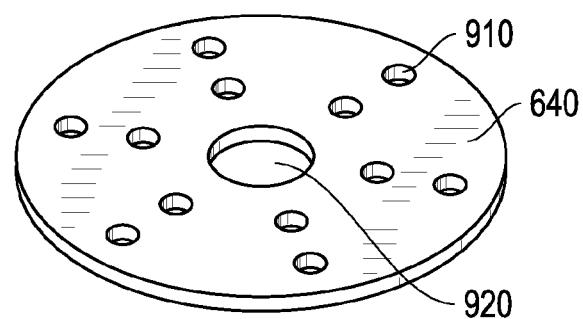
FIG. 10 is an isometric top view illustration of an exemplary embodiment of a blade assembly hub of the present disclosure.

FIG. 10 is an isometric side view of an exemplary embodiment of a blade hub of the present disclosure. Fastener locations 910 are used to attach blades 410 to hub 640. Mounting hole 920 is used to attach generator 810 to hub 640 and ensure that generator 810 is centered on hub 640.

Features and advantages of various specific embodiments of the power recovery system described herein include but are not limited to:

(1) Blade curvature—curved blades create an airfoil which makes the blades turn even at low exhaust gas velocities, for improved power output from the generator.

(2) Low start-up torque design—blade rotation in low exhaust gas speeds allows power recovery from relatively low volume or low speed HVAC exhaust.

(3) Light weight blades—do not restrict HVAC condenser exhaust.

(4) The present apparatus harnesses an underutilized, ubiquitous, energy source.

(5) The present apparatus obtains power recovery in a range that includes but is not limited to 100 watt to 500 watt output. The power obtained by the present apparatus is, of course, contingent on the size of HVAC condenser to which the apparatus is mounted. The present apparatus contemplates a variety of preferred sizes to fit standard and non-standard HVAC exhaust sizes. The present apparatus is easily customized to fit on non-standard HVAC exhausts.

(6) Wire guard—provides protection from operator and does not restrict HVAC condenser exhaust.

(7) Small hub 640 diameter (3.25 inches, for example)—allows for improved blade coverage over source area (exhaust area).

(8) Electromagnetic braking system (on generator 810) preferred embodiments of the generator 810 of the system provide an electromagnetic braking system which maintains consistent voltage output in variable wind speeds. Consistent output is advantageous for connection of the electricity produced by the generator.

(9) Connectivity—Although grid connection is contemplated as a primary application of the present apparatus, off grid uses, such as battery storage, may also find utility.

(10) Components of the apparatus are waterproof and have non-corrosion ratings.

(11) Operational temperature range is −30 c to 180 c which allows for use in extreme climate areas.

(12) Easy 4 bolt installation to most HVAC condensers.

Many modifications and other embodiments of the power recovery system described herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An energy recovery system, comprising:
   a shroud that is cylindrical and having an inner width, a first end and a second end, the first end of the shroud is configured to receive a gas flow from a gas flow channel of an HVAC system having a single gas flow channel with a gas flow channel width, and the shroud is configured to transmit the received gas flow from the first end to the second end;
   a blade assembly coupled to and enclosed by the shroud and configured to be moved with a starting torque of not greater than 0.5 N-m by the received gas flow, and the blade assembly has a blade diameter that is greater than the gas flow channel width by at least about 0.5 inches; and
   an electrical generator coupled to the blade assembly, the electrical generator comprising an alternating current, permanent magnet, gearless, brushless direct drive generator that operates at not greater than 1000 rpm, and being configured to generate electricity when the blade assembly rotates relative to the shroud, the generator has a rated voltage of 24V to 48V, the generator comprises a generator diameter that is less than the blade diameter, the generator comprises an electromagnetic braking system configured to maintain consistent voltage output at variable gas flow rates, and the generator is coupled to a hub of the blade assembly adjacent an axial center thereof.

2. The system of claim 1, wherein the generator has an output in a range of 100 to 500 W/h.

3. The system of claim 1, wherein the generator comprises a rotor and a stator, each of which has a diameter that is less than the blade diameter, and the second end is covered by a wire guard.

4. The system of claim 1, wherein the blade diameter is less than the shroud inner width by at least 0.5 inches, the blade assembly comprises a blade having a thickness of about 0.0625 inches, and the blade has a shape that is of about a 90 degree arc angle.

5. The system of claim 1, wherein the energy recovery system is configured to be bolted onto the HVAC system.

6. The system of claim 1, wherein the generator is not connected to a power grid.

7. An energy recovery system, comprising:
   a shroud that is cylindrical and having an inner width, a first end and a second end, the first end of the shroud is configured to receive a gas flow from a gas flow channel of an HVAC system having a single gas flow channel with a gas flow channel width, the second end is covered by a wire guard, and the shroud is configured to transmit the received gas flow from the first end to the second end;
   a blade assembly coupled to and enclosed by the shroud and configured to be moved with a starting torque of not greater than 0.5 N-m by the received gas flow, the blade assembly has a blade diameter that is at least about 0.5 inches less than the frame inner width, and the blade diameter is at least about 0.5 inches greater than the gas flow channel width;
   an electrical generator coupled to the blade assembly and comprising an alternating current, permanent magnet, gearless, brushless direct drive generator that operates at not greater than 1000 rpm, the electrical generator being configured to generate electricity when the blade assembly rotates relative to the frame, the generator is attached to a hub of the blade assembly adjacent an axial center thereof, the generator comprises a generator diameter that is less than the blade diameter, the generator has a rated voltage in a range of 24V to 48V, the generator has an output in a range of 100 W/h to 500 W/h, the generator is not connected to a power grid, and the generator comprises an electromagnetic braking system configured to maintain consistent voltage output at variable gas flow rates; and
   the energy recovery system is configured to be bolted onto the HVAC system.

* * * * *